(12) United States Patent
Kleine-Hollenhorst et al.

(10) Patent No.: US 11,756,753 B2
(45) Date of Patent: Sep. 12, 2023

(54) OPERATING DEVICE FOR A VEHICLE

(71) Applicant: BEHR-HELLA THERMOCONTROL GMBH, Lippstadt (DE)

(72) Inventors: Holger Kleine-Hollenhorst, Lippstadt (DE); Michael Arens, Forchtenberg-Ernsbach (DE)

(73) Assignee: BEHR-HELLA THERMOCONTROL GMBH, Lippstadt (DE)

( * ) Notice: Subject to any disclaimer, the term of this patent is extended or adjusted under 35 U.S.C. 154(b) by 0 days.

(21) Appl. No.: 17/762,555

(22) PCT Filed: Sep. 29, 2020

(86) PCT No.: PCT/EP2020/077225
§ 371 (c)(1),
(2) Date: Mar. 22, 2022

(87) PCT Pub. No.: WO2021/063944
PCT Pub. Date: Apr. 8, 2021

(65) Prior Publication Data
US 2022/0344112 A1    Oct. 27, 2022

(30) Foreign Application Priority Data
Sep. 30, 2019    (DE) .................... 10 2019 126 321.2

(51) Int. Cl.
*H01H 13/14* (2006.01)
*H01H 13/04* (2006.01)
(Continued)

(52) U.S. Cl.
CPC ............ *H01H 13/14* (2013.01); *H01H 13/04* (2013.01); *H01H 13/70* (2013.01); *B60K 37/06* (2013.01)

(58) Field of Classification Search
CPC ........ H01H 13/14; H01H 13/04; H01H 13/70; H01H 13/85; H01H 2003/323;
(Continued)

(56) References Cited

U.S. PATENT DOCUMENTS 6,919,522 B2    7/2005  Uehira
10,216,291 B1 *    2/2019  Lu ........................... G06F 3/033
(Continued)

FOREIGN PATENT DOCUMENTS

DE    7825480 U1    12/1978
EP    3 020 896 A1    5/2016

OTHER PUBLICATIONS

International Search Report (PCT/ISA/210) issued in PCT Application No. PCT/EP2020/077225 dated Jan. 11, 2021 with English Translation.
(Continued)

*Primary Examiner* — Lheiren Mae A Caroc
(74) *Attorney, Agent, or Firm* — BakerHostetler

(57) ABSTRACT

The operating device for a vehicle is provided with a housing having a front wall. At least one operating element is arranged on the front wall and can be manually actuated starting from a rest position for the purpose of entering a command or activating a function. The operating element is associated with a switch having a switching member on which the operating key acts during manual operation. Furthermore, a support element is arranged in the housing at a distance from the operating element, on which support element the switch associated with the operating element is arranged, the support element having a bending bar with an upper side facing the operating element and a lower side facing away from the upper side, and the switch being arranged on the bending bar. Finally, the operating device is provided with an adjustment member acting on the bending (Continued)

bar for adjusting the bending position of the bending bar relative to the operating element in its resting position and for maintaining and thus stabilizing the bending bar in its adjusted bending position when the operating element acts on the switching member. The adjustment member comprises a threaded sleeve with an internal thread and a self-tapping adjustment screw with a threaded shaft, wherein the internal thread of the threaded sleeve and the external thread of the threaded shaft of the self-tapping adjustment screw have the same or substantially the same pitch.

9 Claims, 3 Drawing Sheets

(51) Int. Cl.
  *H01H 13/70* (2006.01)
  *B60K 37/06* (2006.01)
(58) Field of Classification Search
  CPC ....... H01H 2215/028; H01H 2221/032; H01H 2231/026; H01H 1/50; B60K 37/06; B60K 2370/128; B60K 2370/1446; B60K 2370/158; B60K 2370/691; B60K 2370/92

See application file for complete search history.

(56) References Cited

U.S. PATENT DOCUMENTS

| | | | |
|---|---|---|---|
| 11,225,146 B2* | 1/2022 | Lamminger | B60K 37/06 |
| 2004/0055846 A1 | 3/2004 | Conrad et al. | |
| 2008/0316064 A1 | 12/2008 | Wang | |
| 2012/0044660 A1 | 2/2012 | Rappoport et al. | |
| 2015/0206671 A1* | 7/2015 | Yang | H01H 13/14 |
| | | | 200/341 |

OTHER PUBLICATIONS

Written Opinion (PCT/ISA/237) issued in PCT Application No. PCT/EP2020/077225 dated Jan. 11, 2021.

* cited by examiner

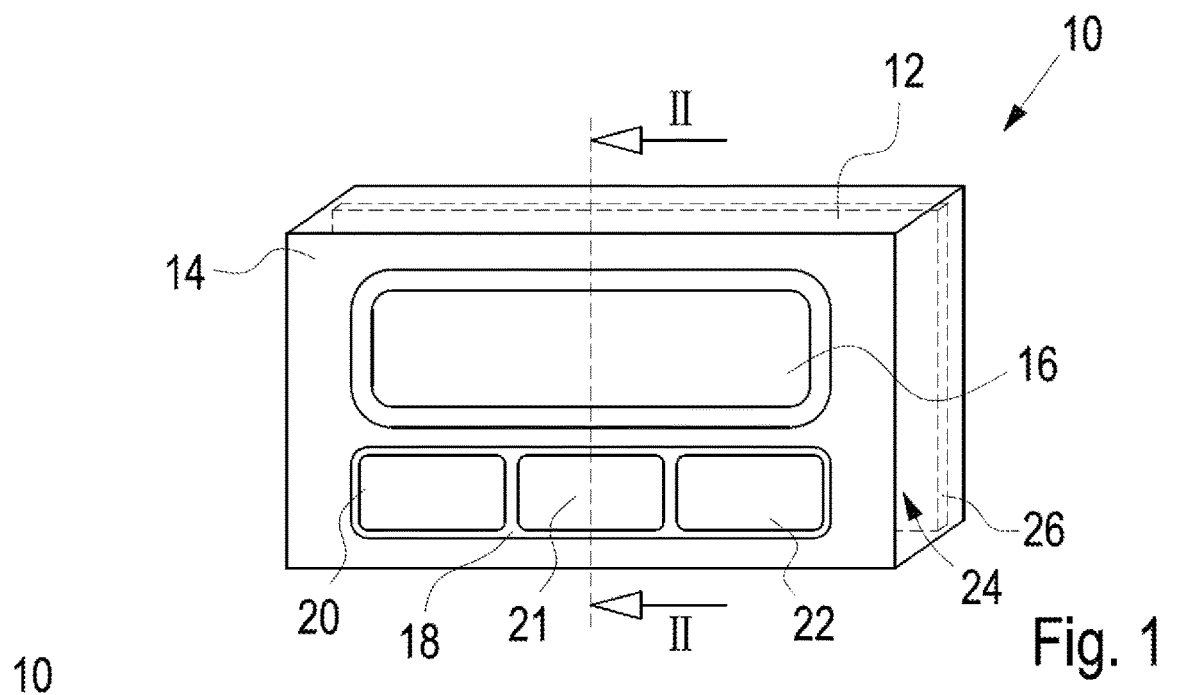
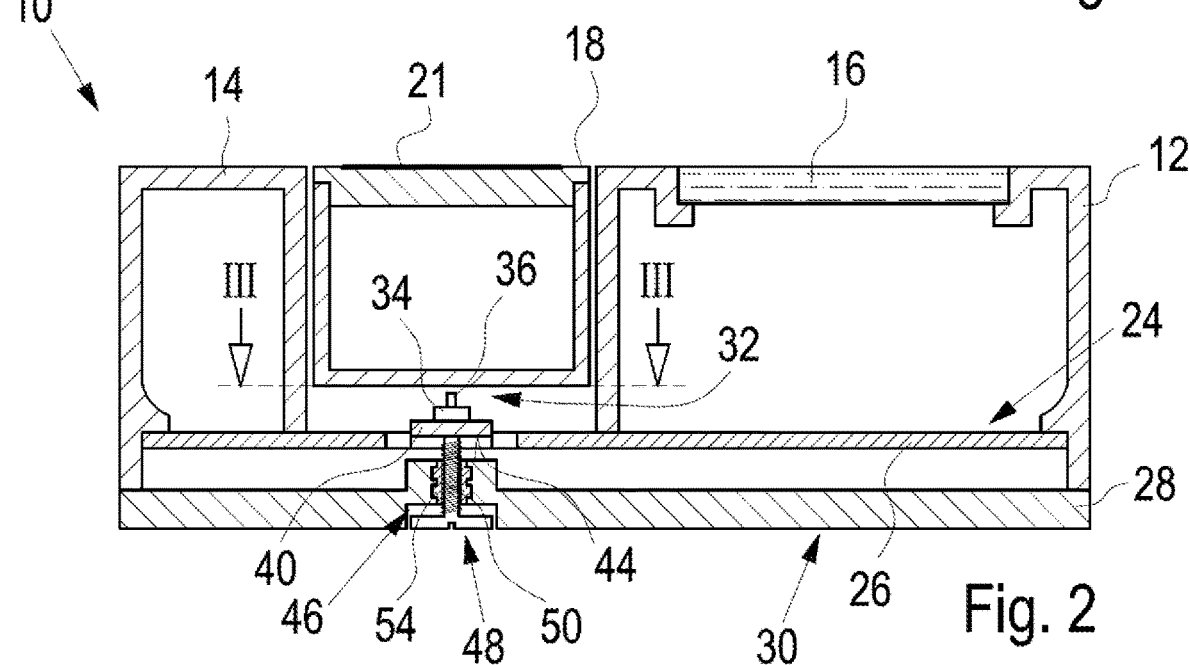
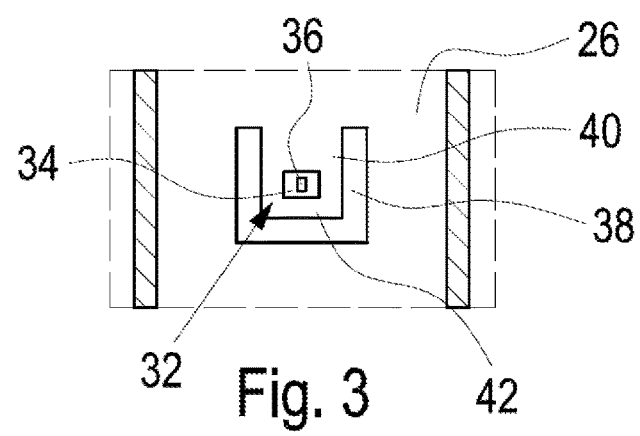

OPERATING DEVICE FOR A VEHICLE

CROSS-REFERENCE OF RELATED APPLICATIONS

This application is the U.S. National Phase under 35 U.S.C. § 371 of International Patent Application No. PCT/EP2020/077225, filed on Sep. 29, 2020, which claims priority to German Patent Application No. 10 2019 126 321.2, filed on Sep. 30, 2019, the entire disclosures of each are incorporated by reference herein.

TECHNICAL FIELD

The invention relates to an operating device for a vehicle and in particular for a vehicle component such as, for example, an air conditioning, a navigation device, an infotainment system. In particular, the invention relates to a human-machine interface (HMI) for a vehicle.

BACKGROUND

Operating devices for vehicles are constructed and designed according to different operating concepts. In the case of operating devices with operating keys, it is sometimes desirable to keep the key stroke as short as possible (so-called short-stroke keys). In particular, when manufacturing operating devices, efforts are made to ensure that depressible operating elements such as operating keys or also depressible displays with touch function cover the required, in particular identical strokes until the switch triggering position assigned to the operating element is reached, despite given manufacturing tolerances. This is particularly challenging with short-stroke keys.

Operating devices in which the depressing stroke of the operating elements is adjustable are described in U.S. Pat. No. 6,919,522, US-A-2008/0316064 and US-A-2012/0044660. In the operating device according to US-A-2012/0044660, a switch assigned to an operating key is located on a flexible printed circuit board which is movable by means of an adjustment screw towards the operating element in order to adjust the switching path. In the operating devices according to US-A-2008/0316064 and U.S. Pat. No. 6,919,522, adjustment screws for adjusting the switching paths are located on the operating keys.

DE-U-78 25 480 shows short-stroke keys with adjustable stroke. Here, the stroke between the area surface and the tongues and thus a certain contact distance can be set by selecting the transmission ratio.

An adjustment device for a key element is described from EP-A-3 020 896. Thus, a fine adjustment of the rest position of the key element is possible.

SUMMARY OF THE DISCLOSURE

An object of the invention is to create an operating device for a vehicle, the construction of which allows for the tolerance-compensating adjustment of the switch triggering position in a simple manner.

The object of the invention is achieved by providing an operating device for a vehicle, comprising
a housing having a front wall,
at least one operating element which can be manually actuated starting from a rest position for the purpose of entering a command or activating a function,
a switch, which is assigned to the operating element, having a switching member on which the operating element acts during manual operation,
a support element arranged inside the housing with a distance to the operating element,
wherein the support element comprises a bending bar with an upper side facing the operating element and a lower side facing away from the upper side, and
wherein the switch assigned to the operating element is arranged on the bending bar, and
an adjustment member acting on the bending bar for adjusting the bending position of the bending bar relative to the operating element in its resting position and for maintaining and thus stabilizing the bending bar in its adjusted bending position when the operating element acts on the switching member,
wherein the adjustment member comprises a threaded sleeve with an internal thread and an adjustment screw with a threaded shaft in the form of a self-tapping screw, wherein the internal thread of the threaded sleeve and the external thread of the threaded shaft of the adjustment screw have the same or substantially the same pitch.

In the operating device according to the invention, the position of the switch can be adjusted at the factory relative to the operating element assigned to said switch. Typically, the switches assigned to the operating elements are arranged on a printed circuit board or, in general terms, on a support element located behind the front wall of the housing in the latter. In addition to electrical conducting paths, other electrical and electronic components are arranged on the printed circuit board. The switches can be, for example, short-stroke switches or a switching mat resting on a printed circuit board. Capacitive, resistive, inductive or optical switches in the form of sensors and in particular displacement sensors can also be used.

According to the invention, the switch assigned to an operating element is now located on a bending bar of the support element. If the support element is designed as a printed circuit board, said bending bar can be designed as a web cut free on three sides, one end of which is integrally connected to the printed circuit board and the other end of which is free. However, the bending bar can also be arranged as an additional separate component on the support element, e.g. as a tongue or the like protruding element. An adjustment member acts on the bending bar, allowing the position of the bending bar to be changed. The adjustment member also serves to stabilize the assumed bending position of the bending bar when the switching member of the switch is acted upon when the operating element is actuated and thus pressure is exerted on the bending bar via the switching member or the switch, if necessary.

Since the rotational position of the adjustment screw should not change despite vibrations acting on the operating unit, the adjustment screw should be secured against rotation. With conventional adjustment screws, an adhesive or locking varnish is used in this context. The adjustment member proposed according to the invention is self-locking by design. This is realized by the self-tapping screw in combination with the threaded sleeve provided with an internal thread. A self-tapping screw typically comprises a thread having multiple high points when viewed over a 360° pitch. For example, a self-tapping screw with three high points is called a trilobular thread form. In addition, the radius profile of the thread of a thread-cutting screw is formed in a manner that is not triangular in cross-section, as is the case with normal non-thread-cutting or non-selftapping screws, but deviates therefrom and can have an involute form, for example. Such a screw is used per se for self-tapping thread forming in e.g. a blind hole (for example formed as a cast hole). According to the invention, a threaded sleeve with an internal thread is used for thread engagement of the self-tapping screw. This reduces the torques to be applied when screwing in the self-tapping screw, but without having to dispense with the self-locking effect of the adjustment screw in the approached adjusting position.

The (external) oversize of the self-tapping adjustment screw formed by the high points (as well as their number) and by the thread cross-section shape compared to the internal dimension of the threaded sleeve is determined by the torque required for screwing the self-tapping adjustment screw into the sleeve and for the self-holding effect.

The fine adjustment of the desired switch triggering position can now be carried out in such a way that, when the operating device is completed, the adjustment member assigned to a switch or a bending bar is adjusted with the operating element in its rest position in order to bend the bending bar so that the switch is moved forward in the direction of the operating element. This procedure continues until the switch or the switching member of the switch is in its switch triggering position. A certain minimum torque must be overcome when rotating the adjustment screw. By subsequently moving or adjusting the adjustment member back by a predetermined amount, the bending bar can now be transferred to a bending position in which the switch is then at a distance from the operating element that corresponds to the desired trigger path by which the operating element must be depressed when actuated until the switch member reaches the switch triggering position. When the adjustment screw is turned back in this context, the minimum torque to be applied is lower than when it was previously screwed in, but still high enough for self-locking of the adjustment screw. This makes it possible to dispense with safety measures to protect against unintentional rotation of the adjustment screw by means of adhesive or locking varnish, for example, which simplifies assembly and reduces assembly costs.

The self-tapping adjustment screw used according to the invention is sometimes also referred to as a thread-tapping screw. Self-tapping screws suitable for being used as an adjustment screw in the sense of the invention are sold, for example, by ARNOLD UMFORMTECHNIK GmbH and Co. KG under the brand name TAPTITE.

The operating element is typically an element having several buttons and a touch sensor system (capacitive, resistive, optical or inductive). Thus, the one switch is always used to initiate a command entered by touching one of the buttons on the operating element.

The adjustment member is preferably mounted or guided on a reference element that has a defined and constant position with respect to the support element and the operating element (in its rest position).

In other words, as described above, the invention advantageously provides that the switching member movable by the operating element along a switching path to a switch triggering position, and that the bending bar can be transferred to a bending position by means of the adjustment member and can be fixed in said bending position, in which the trigger path by which the operating element can be moved until the switch triggering position is reached, e.g. by a switching member, has a predefinable length, while compensating for assembly and/or manufacturing tolerances of the housing of the operating element and of the switch.

Another advantage of the adjustment screw is that the amount by which the adjustment member is then moved back when the switching member has reached the switch triggering position during fine adjustment of the switch is defined on the basis of the amount of rotation of the adjustment screw when the thread pitch is known and can be approached in a targeted manner.

In one embodiment of the invention, it is advantageously provided that the threaded sleeve is fixedly connected or integrally formed with the reference element positioned relative to the bending bar of the support element. This then allows the threaded shaft end of the adjustment screw to move forward in the direction of the bending bar and bend it by rotating the adjustment screw, wherein the threaded shaft in turn follows the position of the threaded shaft end of the adjustment screw when the bending bar moves back due to its elasticity. The end of the threaded shaft contacting the bending bar is expediently convexly bulged out (i.e. provided with a "radius tip") so that the threaded shaft rests against the bending bar as possible with point contact and thus with constant definition over a full rotation of the threaded screw.

Alternatively to the previously mentioned, the adjustment screw can also be held in axial position as a "loose screw" on the reference element, in which case the threaded shaft of the adjustment screw is in thread engagement with the threaded sleeve fixed/mounted/integrated on and/or in the bending bar and can bend it bidirectionally.

In order to avoid having to take into account lever transmission ratios on the bending bar when making fine adjustments to the switch by bending the bending bar or bending it back, it is advantageous if the adjustment member acts on the bending bar at a position which is in extension of the movement of the switching member when it is actuated by the operating element. In the case of an adjustment member that rests on one side of the bending bar and acts to a greater or lesser extent on the bending bar during its adjustment in order to bend it in the direction of the operating element or to relieve the bending bar during the return movement, it is provided in accordance with an advantageous embodiment of the invention that the switch is arranged on the upper side of the bending bar facing the operating element and that the adjustment screw rests on the lower side of the bending bar facing away from the upper side and in alignment with the switch.

The concept according to the invention makes is possible to arrange switch systems in compound so that a short response of the operating element with switching paths of up to less than 0.4 mm is possible. Furthermore, the smallest actuation travels (less than 0.3 mm) can be implemented. The tolerance of the switch system in compound can be reduced to less than +/−0.1 mm. The tolerances of the individual parts (key body, key guidance on the housing or front panel, switch, switching member) and their assembly can be compensated.

In a further advantageous embodiment of the invention, it can be provided that the operating device is provided with a haptic feedback. It increases the ease of use if the user is signaled the recognition of a valid operation of the operating element. This is particularly done in an advantageous manner by tactile feedback. Such haptic feedback can be realized mechanically, electromechanically or electrically, for example. A mechanical tactile feedback can be realized by stimulating the display mechanically in a pulse-like manner by means of an actuator. Another way of implementing haptic feedback is to emboss bending waves into the display or into the cover glass of the display. Another possibility of realizing haptic feedback is a purely electrically operating variant by means of locally generated electric fields.

In general, the proposal according to the invention for an adjustment member can be used to adjust the position of a detector relative to an element to be detected, wherein the detector is arranged on a bending bar. With reference to the embodiment described herein, the switch would therefore be the detector and the element to be detected would be, in the broadest sense, the operating element whose depression is to be detected. The detector can respond to a mechanical touch, or it can function touchless.

BRIEF DESCRIPTION OF THE DRAWINGS

The invention is explained in more detail below by means of an exemplary embodiment and with reference to the drawing, in which FIG. 1 shows a front view (perspective) of an operating device, FIG. 2 shows a section through the operating device according to II-II of FIG. 1, FIG. 3 shows a sectional view in the area of FIG. 2, FIGS. 4 to 7 show the individual phases during fine adjustment of the switch system (with regard to an operating element)

DETAILED DESCRIPTION

Figure 4:
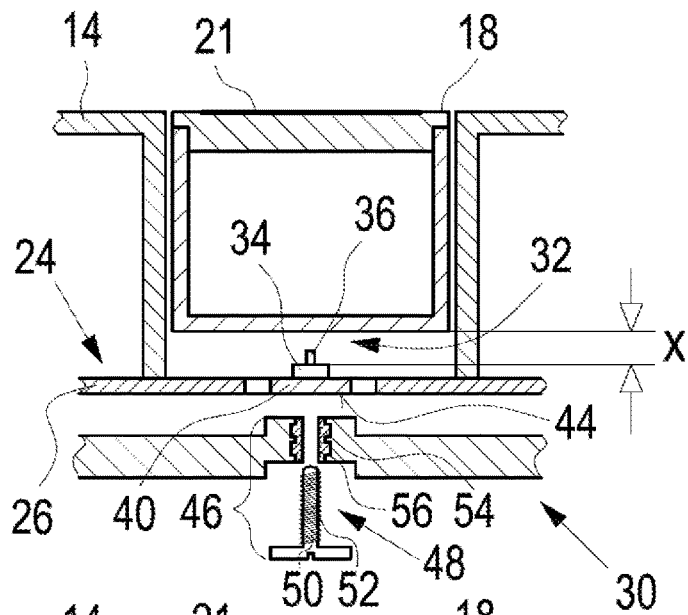

In FIGS. 1 to 3, the basic construction of an exemplary embodiment of an operating device 10 is shown. In this exemplary embodiment, the operating device 10 comprises a housing 12, on the front wall 14 of which, for example, a display 16 and an operating element 18 in the form of a strip with three control panels 20, 21, 22 are located. A support element 24 for various electrical and electronic components are located inside the housing 12. Said support element 24 is typically a printed circuit board 26. The housing 12 further comprises a rear wall 28 which in this exemplary embodiment also performs the function of a reference element 30, which will be discussed further below.

According to the sectional views of FIGS. 2 and 3, in this exemplary embodiment a mechanical switch 32 comprising a switch housing 34 and a switching member 36 is located below the operating element 18. In this case, the switching element 36 is designed as a plunger which, when depressed, moves, for example, an electrically conductive element for electrically connecting two contact fields. When the operating element 18 is actuated, it is detected by sensors (e.g., capacitively) which of the control panels 20, 21, 22 is touched by, for example, a finger of a hand, in order to then execute the command corresponding to the control panel touched when the switch 32 is triggered.

The switch 32 is located in an area of the support element 24 where the support member 24 has a U-shaped cut out 38, for example. In this way, a bending bar 40 is formed, on whose upper side 42 facing the operating element 18 the switch 32 is located.

An adjustment member 46 acts on the lower side 44 of the bending bar 40, which is designed as a self-tapping adjustment screw 48 with a threaded shaft 50 and external thread 52 in combination with a threaded metal sleeve 54 with internal thread 56 (see also FIG. 4). For example, the adjustment screw 48 has steel as its material, while the threaded sleeve 54 is made of a metal that is "softer" than the material of the adjustment screw 48, such as brass. With its threaded shaft 50, the adjustment screw 48 is in thread engagement with the threaded sleeve 54 embedded in the rear wall 28. The threaded sleeve 54 is overmolded by typically plastic material of the rear wall 28 and is thus injection molded into the rear wall 28 and has a comparatively large surface roughness on its outer side (for example, produced by knurling), so that the plastic material and the threaded sleeve 54 interlock with one another and so that the threaded sleeve 54 is positioned or remains positioned in a rotationally fixed manner even at increased torques which occur due to the pairing of the self-tapping adjustment screw 48 and the threaded sleeve 54 when the adjustment screw 48 is screwed in and out. Preferably, the threaded shaft end 58 of the adjustment screw 48, which is in particular convexly bulged out, acts opposite the switch 32 on the lower side of the bending bar 40 by resting thereon.

In FIG. 2, the bending bar 40 is bent in the direction of the operating element 18 so that the switch 32 is in the desired position relative to the rest position of the operating element 18. This distance position defines that the operating element 18 triggers the switch 32 after being depressed by the desired distance. The operating element 18 is secured in a known manner against movement out of the housing 12 by, for example, latching hooks or snap-fits.

The procedure for fine adjustment of the switch system consisting of operating element 18 and associated switch 32 according to the invention is described briefly below with reference to FIGS. 4 to 7.

Figure 7:
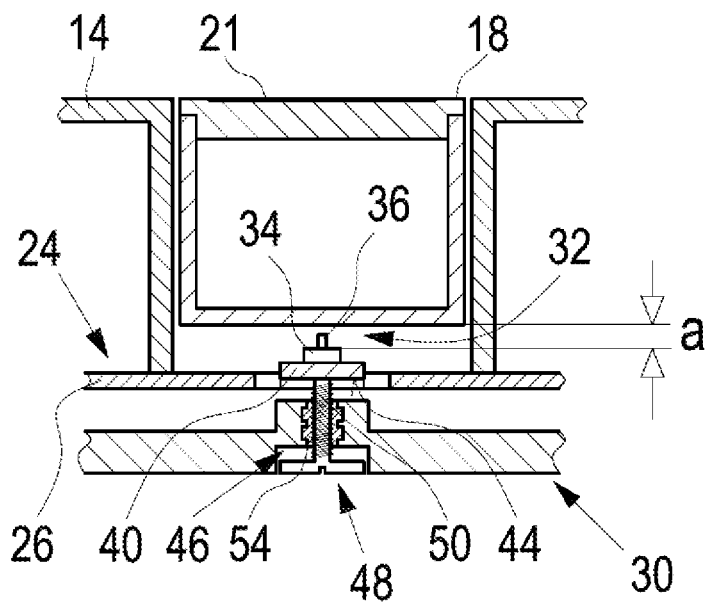

At the start of the adjustment process, the switch 32 (in this case the switch housing 34) has a distance x (see FIGS. 4 and 5) to the lower side of the operating element 18 in the rest position, the distance being greater than the desired trigger path a (see FIG. 7). By means of the adjustment screw 48, the bending bar 40 is now bent in the direction of the operating element 18, which moves the switch 32 against the lower side of the operating element 18. Here, the adjustment screw 48 must be screwed into or screwed to the threaded sleeve 54 while overcoming a certain minimum torque. After the adjustment or bending path b has been covered, switch 32 is triggered (see FIG. 5). The switching signal is input, for example, via a device test interface at the end of the assembly of the operating device 10, which terminates further actuation of the adjustment screw 48, which is done automatically, for example. Now it is known when the switch 32 triggers.

In this situation, the switch system is arranged in the switched state and without play in the operating device. It should be noted that the switch 32 should not be collapsed to block size; this is for mechanical protection of the switch 32.

Figure 5:
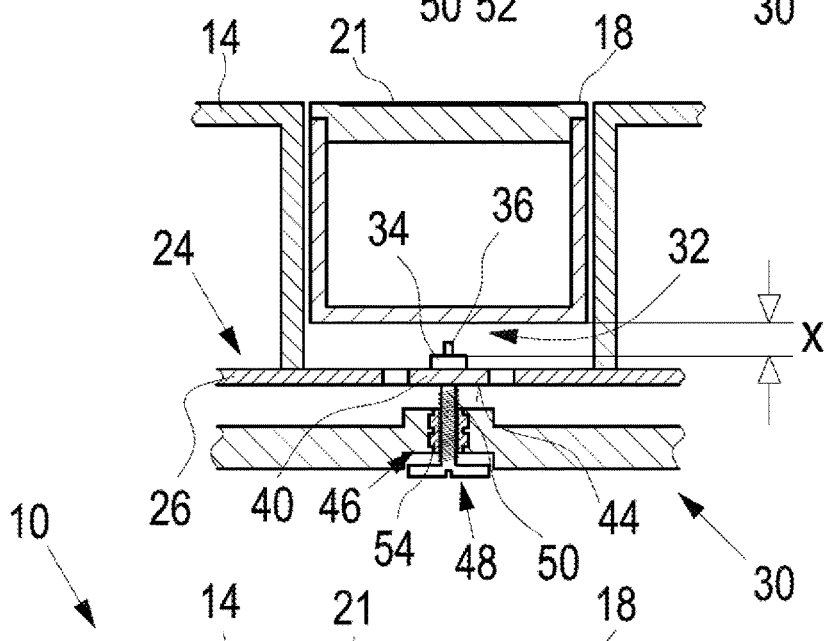
Figure 6:
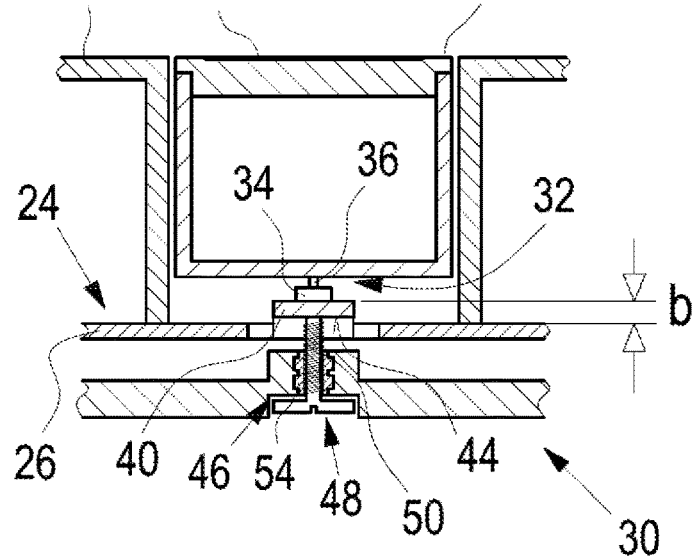

In other words, if the situation according to FIG. 5 is present, it is known where the switching point (free of play) of the switch 32 is located in the system.

Conversely, an exact switching path (trigger path) of the switch system can now be set free of play with a specific reset of the adjustment screw 48 (whose thread pitch dimension is known). With this resetting of the adjustment screw 48 by turning it back, the switch 32 is brought into its end position in which, when the operating element 18 is depressed, the switching member 36 of the switch 32 is moved to the switch triggering position and thus the operating element 18 is moved by the trigger path a (see FIG. 7). Turning back the adjustment screw 48 is in turn done by overcoming a minimum torque, which is lower than during the previous screwing in but sufficiently high, so that a reliable self-locking in the final setting position of the adjustment screw 48 is given.

Figure 8:
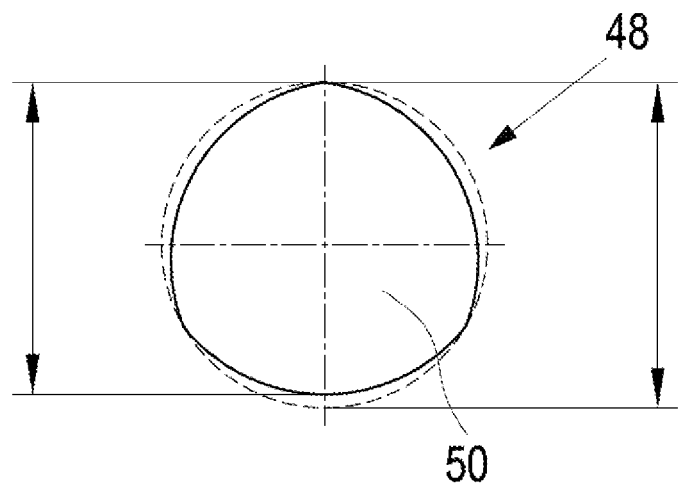
FIGS. 8 and 9 show illustrations in section and in side view of the self-tapping threaded shaft of the adjustment screw.
Figure 9:
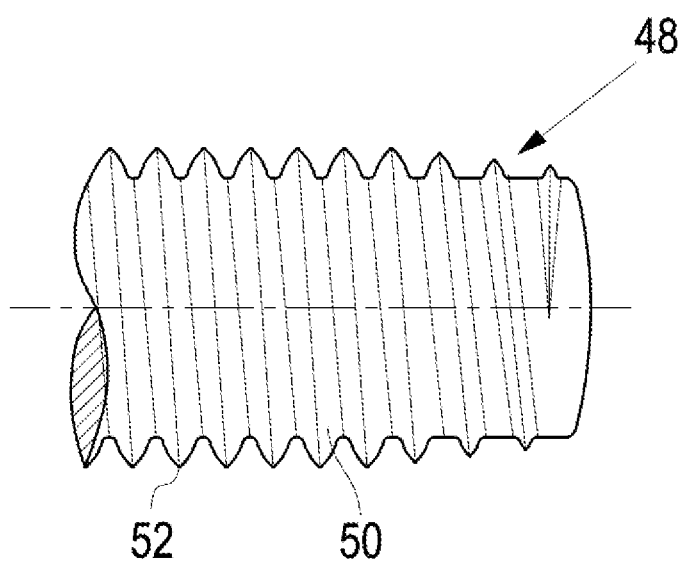

An example of the shape of the self-tapping adjustment screw 48 is shown in FIGS. 8 and 9. According to this, the adjustment screw 48 has a trilobular shape in terms of its cross-section. The threaded shaft end 58 is slightly tapered and has a centering or guide thread that is not necessarily trilobular in shape. A self-tapping adjustment screw with trilobular shape is known commercially, for example, under TAPTITE 2000 or DUO TAPTITE 2000.

In addition, the adjustment member 46 stabilizes the bending bar 40 in its bending position assumed after adjustment.

With the previously described method and the previously described operating device design or switch system consisting of operating element 18 and switch 32 as well as bending bar 40, it is possible to reduce the tolerance chain of this mechanical "composite system" to zero. Small switching paths can be compensated for in spite of high component tolerances and large tolerance chains in the composite.

LIST OF REFERENCE NUMERALS

10 operating device
12 housing
14 front wall
16 display
18 operating element
20 operating panel
21 operating panel
22 operating panel
24 support element
26 printed circuit board
28 rear wall
30 reference element
32 switch
34 switch housing
36 switching member
38 cut out
40 bending bar
42 upper side
44 lower side
46 adjustment member
48 adjustment screw
50 threaded shaft
52 external thread of threaded shaft
54 threaded sleeve
56 internal thread of threaded shaft
58 threaded shaft end
x distance
a trigger path
b bending path

The invention claimed is:

1. An operating device for a vehicle, comprising
a housing having a front wall,
at least one operating element which can be manually actuated starting from a rest position for the purpose of entering a command or activating a function,
a switch, which is assigned to the operating element, having a switching member on which the operating element acts during manual operation,
a support element arranged inside the housing with a distance to the operating element,
wherein the support element comprises a bending bar with an upper side facing the operating element and a lower side facing away from the upper side,
wherein the switch assigned to the operating element is arranged on the bending bar, and
an adjustment member acting on the bending bar for adjusting the bending position of the bending bar relative to the operating element in a resting position and for maintaining and thus stabilizing the bending bar in an adjusted bending position when the operating element acts on the switching member,
wherein the adjustment member comprises a threaded sleeve with an internal thread and an adjustment screw with a threaded shaft in the form of a self-tapping screw, wherein the internal thread of the threaded sleeve and the external thread of the threaded shaft of the adjustment screw have a same or substantially the same pitch.

2. The operating device according to claim 1, wherein the threaded sleeve is arranged on and/or in a reference element positioned relative to the bending bar of the support element, and, when the self-tapping adjustment screw is rotated, an end of the threaded shaft rests against the bending bar and acts thereon to bend the bending bar.

3. The operating device according to claim 2, wherein the end of the self-tapping adjustment screw is formed so as to be convexly curved and/or the threaded sleeve is held in a rotationally fixed manner by means of a form fit.

4. The operating device according to claim 1, wherein the threaded shaft of the self-tapping adjustment screw is rotatably and axially held on and/or in a reference element positioned relative to the bending bar of the support element, wherein, when rotating the self-tapping adjustment screw, the bending bar is bendable.

5. The operating device according to claim 1, wherein the switch has a switching member movable by the operating element along a switching path to a switch triggering position, and wherein the bending bar can be transferred to a bending position by means of the self-tapping adjustment screw and can be fixed in said bending position, in which the switching path has a predefinable length, while compensating for assembly and/or manufacturing tolerances of the housing, of the operating element, and of the switch.

6. The operating device according to claim 1, wherein the switch has at least two contacts electrically connected in a switch triggering position or the switch is designed as a displacement sensor which operates optically, capacitively, resistively or inductively.

7. The operating device according to claim 1, wherein the self-tapping adjustment screw acts on the bending bar at a position which is in extension of the movement axis of the operating element of the switching member, which extends through the switch, when the switching member is actuated.

8. The operating device according to claim 1, wherein the switch is arranged on the upper side of the bending bar facing the operating element, and wherein the self-tapping adjustment screw rests against the lower side of the bending bar facing away from the upper side and in alignment with the switch.

9. The operating device according to claim 1, wherein the operating element provides tactile feedback of a valid manual actuation of the operating element.

* * * * *